United States Patent
Greene et al.

(10) Patent No.: US 10,607,444 B2
(45) Date of Patent: Mar. 31, 2020

(54) THIRD PARTY ACTIVITY PERFORMANCE CROSS ENTITY INTEGRATION

(71) Applicant: BANK OF AMERICA CORPORATION, Charlotte, NC (US)

(72) Inventors: Tracy Beth Greene, Mooresville, NC (US); Sean Michael Gutman, Waxhaw, NC (US); Emily Paige Bosin, Charlotte, NC (US)

(73) Assignee: BANK OF AMERICA CORPORATION, Charlotte, NC (US)

( * ) Notice: Subject to any disclaimer, the term of this patent is extended or adjusted under 35 U.S.C. 154(b) by 189 days.

(21) Appl. No.: 15/430,002

(22) Filed: Feb. 10, 2017

(65) Prior Publication Data
US 2018/0232995 A1 Aug. 16, 2018

(51) Int. Cl.
*G07F 17/32* (2006.01)
*G06Q 30/02* (2012.01)
*G06Q 30/06* (2012.01)

(52) U.S. Cl.
CPC ..... *G07F 17/3255* (2013.01); *G06Q 30/0209* (2013.01); *G06Q 30/0633* (2013.01); *G07F 17/3227* (2013.01); *G07F 17/3251* (2013.01); *G07F 17/3262* (2013.01); *G07F 17/3269* (2013.01)

(58) Field of Classification Search
USPC ........ 725/24, 10, 34; 705/14.69; 463/25, 20; 434/362
See application file for complete search history.

(56) References Cited

U.S. PATENT DOCUMENTS

| | | |
|---|---|---|
| 5,139,286 A | 8/1992 | Gold |
| 6,890,179 B2 | 5/2005 | Rogan et al. |
| 6,970,871 B1 | 11/2005 | Rayburn |
| 7,899,750 B1 | 3/2011 | Klieman et al. |
| 7,997,969 B1 | 8/2011 | Murrell et al. |
| 8,108,304 B2 | 1/2012 | Loeger et al. |
| 8,262,447 B2 | 9/2012 | Murrell et al. |
| 8,296,206 B1 | 10/2012 | Del Favero et al. |
| 8,463,703 B1 | 6/2013 | Bloomquist et al. |
| 8,517,258 B2 | 8/2013 | Taylor et al. |
| 8,770,473 B2 | 7/2014 | Bufford et al. |

(Continued)

OTHER PUBLICATIONS http://money.usnews.com/money/personal-finance/articles/2012/07/16/the-gamification-of-personal-finance.
https://www.ally.com/do-it-right/money/have-fun-with-finances-level-up-your-finances-using-gamification/.

*Primary Examiner* — Saba Dagnew
(74) *Attorney, Agent, or Firm* — Michael A. Springs; Moore & Van Allen PLLC; Nicholas C. Russell

(57) ABSTRACT

Embodiments of the invention are directed to a system, method, or computer program product for providing a platform for integration into applications for user activity interaction for cross entity and third party reward integration. In this way, the system may integrate an activity platform that provides applications or integration into applications to generate an activities network. Furthermore, the system may monitor the user utilization the activities provide triggered responses based on the activities completed. As such, the system may intervene within a known application or third party to provide triggered responses. In some embodiments, the triggered response may be a reward or status built physical alteration to an application or resource distribution item.

17 Claims, 5 Drawing Sheets

(56) References Cited

U.S. PATENT DOCUMENTS

| | | |
|---|---|---|
| 2002/0128916 A1 | 9/2002 | Beinecke, III |
| 2003/0061093 A1 | 3/2003 | Todd |
| 2003/0061132 A1 | 3/2003 | Yu, Sr. et al. |
| 2003/0069787 A1 | 4/2003 | Tendon et al. |
| 2003/0171992 A1 | 9/2003 | Blagg et al. |
| 2004/0039679 A1 | 2/2004 | Norton et al. |
| 2004/0122736 A1 | 6/2004 | Strock et al. |
| 2004/0238622 A1 | 12/2004 | Freiberg |
| 2004/0243465 A1 | 12/2004 | Manners |
| 2005/0021457 A1 | 1/2005 | Johnson et al. |
| 2005/0154639 A1 | 7/2005 | Zetmeir |
| 2005/0222894 A1 | 10/2005 | Klein et al. |
| 2006/0015390 A1 | 1/2006 | Rijsinghani et al. |
| 2006/0122932 A1 | 6/2006 | Birtwell et al. |
| 2006/0277103 A1 | 12/2006 | Fujita et al. |
| 2007/0078710 A1 | 4/2007 | Bender, II |
| 2007/0094080 A1 | 4/2007 | Wiken |
| 2007/0156530 A1 | 7/2007 | Schmitt et al. |
| 2008/0010151 A1 | 1/2008 | Bridges et al. |
| 2008/0082407 A1 | 4/2008 | Georgiadis et al. |
| 2008/0082418 A1 | 4/2008 | Fordyce et al. |
| 2009/0018916 A1 | 1/2009 | Seven et al. |
| 2009/0144639 A1 | 6/2009 | Nims et al. |
| 2009/0150232 A1 | 6/2009 | Tyler et al. |
| 2009/0181777 A1 | 7/2009 | Christiani et al. |
| 2009/0222358 A1 | 9/2009 | Bednarek |
| 2009/0248509 A1* | 10/2009 | Hamaoui ............... G06Q 30/02 705/14.69 |
| 2010/0010964 A1 | 1/2010 | Skowronek et al. |
| 2010/0088148 A1 | 4/2010 | Presswala et al. |
| 2010/0106580 A1 | 4/2010 | Etheredge et al. |
| 2010/0145718 A1 | 6/2010 | Elmore et al. |
| 2010/0250419 A1 | 9/2010 | Ariff et al. |
| 2010/0274658 A1 | 10/2010 | Celli et al. |
| 2010/0280896 A1 | 11/2010 | Postrel |
| 2010/0287046 A1 | 11/2010 | Bennett et al. |
| 2010/0312620 A1 | 12/2010 | White et al. |
| 2011/0004558 A1 | 1/2011 | MacLean et al. |
| 2011/0028160 A1 | 2/2011 | Roeding et al. |
| 2011/0034240 A1 | 2/2011 | Naicker et al. |
| 2011/0040608 A1 | 2/2011 | Cohen et al. |
| 2011/0231258 A1 | 9/2011 | Winters |
| 2011/0276451 A1 | 11/2011 | Busse |
| 2011/0289443 A1 | 11/2011 | Heaven et al. |
| 2011/0313827 A1 | 12/2011 | Lobb et al. |
| 2012/0004967 A1 | 1/2012 | Satyavolu et al. |
| 2012/0004975 A1 | 1/2012 | Satyavolu et al. |
| 2012/0095576 A1 | 4/2012 | Murrell et al. |
| 2012/0166264 A1 | 6/2012 | Shum et al. |
| 2012/0290451 A1 | 11/2012 | Jones et al. |
| 2013/0005437 A1* | 1/2013 | Bethke ............... G06Q 30/0209 463/25 |
| 2013/0006733 A1 | 1/2013 | Fisher |
| 2013/0014153 A1* | 1/2013 | Bhatia ................ H04N 21/252 725/24 |
| 2013/0030887 A1 | 1/2013 | Calman et al. |
| 2013/0030888 A1 | 1/2013 | Calman et al. |
| 2013/0035987 A1 | 2/2013 | Dreifus et al. |
| 2013/0046607 A1 | 2/2013 | Granville, III |
| 2013/0046634 A1 | 2/2013 | Grigg et al. |
| 2013/0046702 A1 | 2/2013 | Ross et al. |
| 2013/0059651 A1 | 3/2013 | Palermo et al. |
| 2013/0178257 A1 | 7/2013 | Langseth |
| 2013/0281207 A1 | 10/2013 | Lyons et al. |
| 2014/0087355 A1* | 3/2014 | Henry ..................... G09B 7/00 434/362 |
| 2014/0113674 A1 | 4/2014 | Joseph et al. |
| 2014/0136365 A1 | 5/2014 | Nista |
| 2014/0229981 A1* | 8/2014 | Alexander ......... H04N 5/44543 725/34 |
| 2014/0274283 A1 | 9/2014 | Helava et al. |
| 2014/0279799 A1 | 9/2014 | Thomas et al. |
| 2014/0358664 A1 | 12/2014 | Wheeler |
| 2015/0007204 A1* | 1/2015 | Feig ................ H04N 21/44218 725/10 |
| 2015/0235517 A1* | 8/2015 | Griffin .................. G06Q 30/00 463/20 |
| 2016/0071325 A1 | 3/2016 | Callaghan |
| 2016/0180466 A1 | 6/2016 | Caldwell |
| 2017/0140476 A1 | 5/2017 | Lee et al. |

\* cited by examiner

THIRD PARTY ACTIVITY PERFORMANCE CROSS ENTITY INTEGRATION

BACKGROUND

With advancements in technology, interactive application generation and deployment on to user devices is available in an array of industries. These interactive applications are generally provided and integrated within a single entity. However, a need exists for cross linking third party entity resources within an interactive application deployment.

BRIEF SUMMARY

The following presents a simplified summary of one or more embodiments of the invention in order to provide a basic understanding of such embodiments. This summary is not an extensive overview of all contemplated embodiments, and is intended to neither identify key or critical elements of all embodiments, nor delineate the scope of any or all embodiments. Its sole purpose is to present some concepts of one or more embodiments in a simplified form as a prelude to the more detailed description that is presented later.

Embodiments of the present invention address the above needs and/or achieve other advantages by providing apparatuses (e.g., a system, computer program product and/or other devices) and methods for providing a third party activity performance cross entity application integration platform.

In some embodiments, the invention utilizes a gamification platform for cross-selling or third party relationships with the entity. In this way, the system may generate activities for the user to perform in order to achieve milestones that are cross entity or from third parties. For example, the system may require the user to perform activities associated with a third party provided service or product, such as third parties associated with the travel industry or the like. As such, the system may require the user to purchase one or more products such as airline reservations, car rentals, or the like with a single resource distribution channel. The system may then provide an associated reward offer for the resource distribution, such as free in-flight or airport Wi-Fi. In this way, the system is matching the reward with the user specific behavior across multiple entities. Furthermore, the rewards for resource distribution channeling through selected third parties may correlate with user associates such as family, friends, coworkers, or the like.

In some embodiments, the system may generate gaming paths for the various users. In this embodiment, the system may provide simple games or complex games to the user based on user selection. Each game may be linked to either a coin for rewards to a cross cell promotion within the entity or from third parties. The games are generated on a directed application platform that levels the rewards or promotions based on the complexity of the gaming platform provided. In this way, the system provides a game with a meaningful reward to the user for play within the game.

In some embodiments, the system may further generate personalized application appearances for the user based on activities and/or game play from the user. As such, the system may personalize the user on-line application and/or user resource distribution vehicles, such as credit cards, debit cards, or the like, by providing special colored cards, presenting a symbol on the card or application, generating alternative backgrounds, or the like based on the status the user has achieved within the activity or game play. In this way, by performing activities and/or playing games on the cross entity application integration platform, the system may generate a new background or new symbol that may be presented directly on a user's application or resource distribution vehicles based on a level or status achieved by the user within the activities and/or games.

Embodiments of the invention relate to systems, methods, and computer program products for cross entity activity performance platform deployment, the invention comprising: generating a platform for application generation or application integration, wherein the platform comprises activities for user completion; cross entity and third party integrating trigger results for activity completion by the user; implementing, upon user authorization, the platform via a user device for presentation of the activities via a generated application or an integration of the activities onto a third party application; monitoring user interaction with activities; determining status built based on amount of user interaction with activities; and applying physical change to application background and present symbol based on status built achievement.

In some embodiments, the invention further comprises applying a physical change to a resource distribution card associated with the user upon status built achievement, wherein the physical change to the resource distribution card comprises communication with a third party manufacturer of the resource distribution card and manipulation of the background color and addition of a symbol to the resource distribution card for the user.

In some embodiments, the platform integrates into a third party application on the user device and presents activities for the user on the third party application.

In some embodiments, the invention further comprises providing tiered activities to the user, wherein the tiered activities are tiered based on difficultly.

In some embodiments, the invention further comprises identifying life events for a user, wherein the life events are identified by transaction history of the user, wherein the life event includes the user traveling via airline and the transaction history includes a purchase of an airline ticket.

In some embodiments, the activities include electronic games the user manipulates via a user device. In some embodiments, the activities include one or more physical activities for user completion, wherein physical activities include purchasing a product from one or more third party merchants and visiting one or more third party merchant locations.

In some embodiments, trigger results further comprise rewards from a third party associated with user activity completion or a user life event.

BRIEF DESCRIPTION OF THE DRAWINGS

Figure 1:
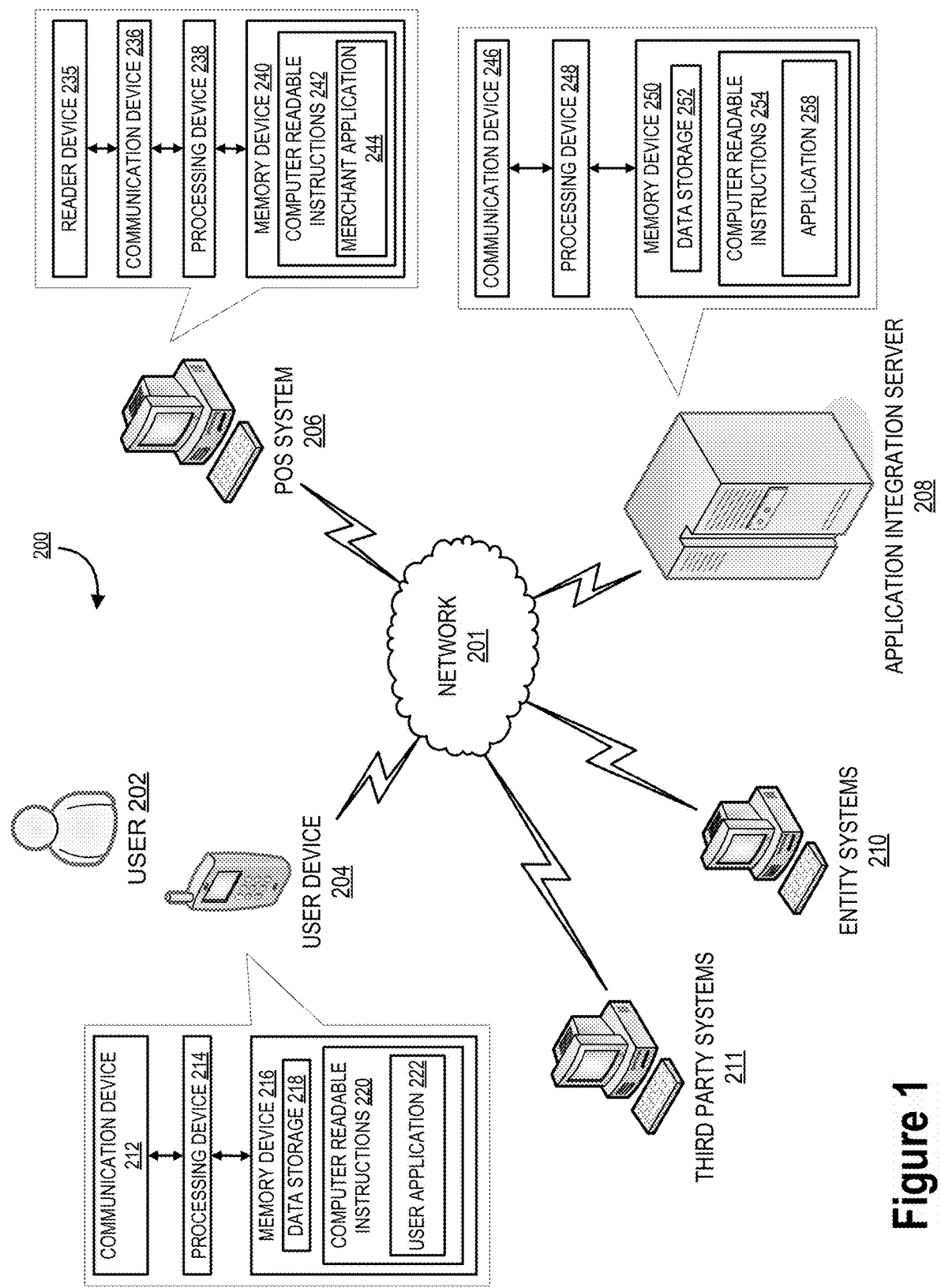
Figure 2:
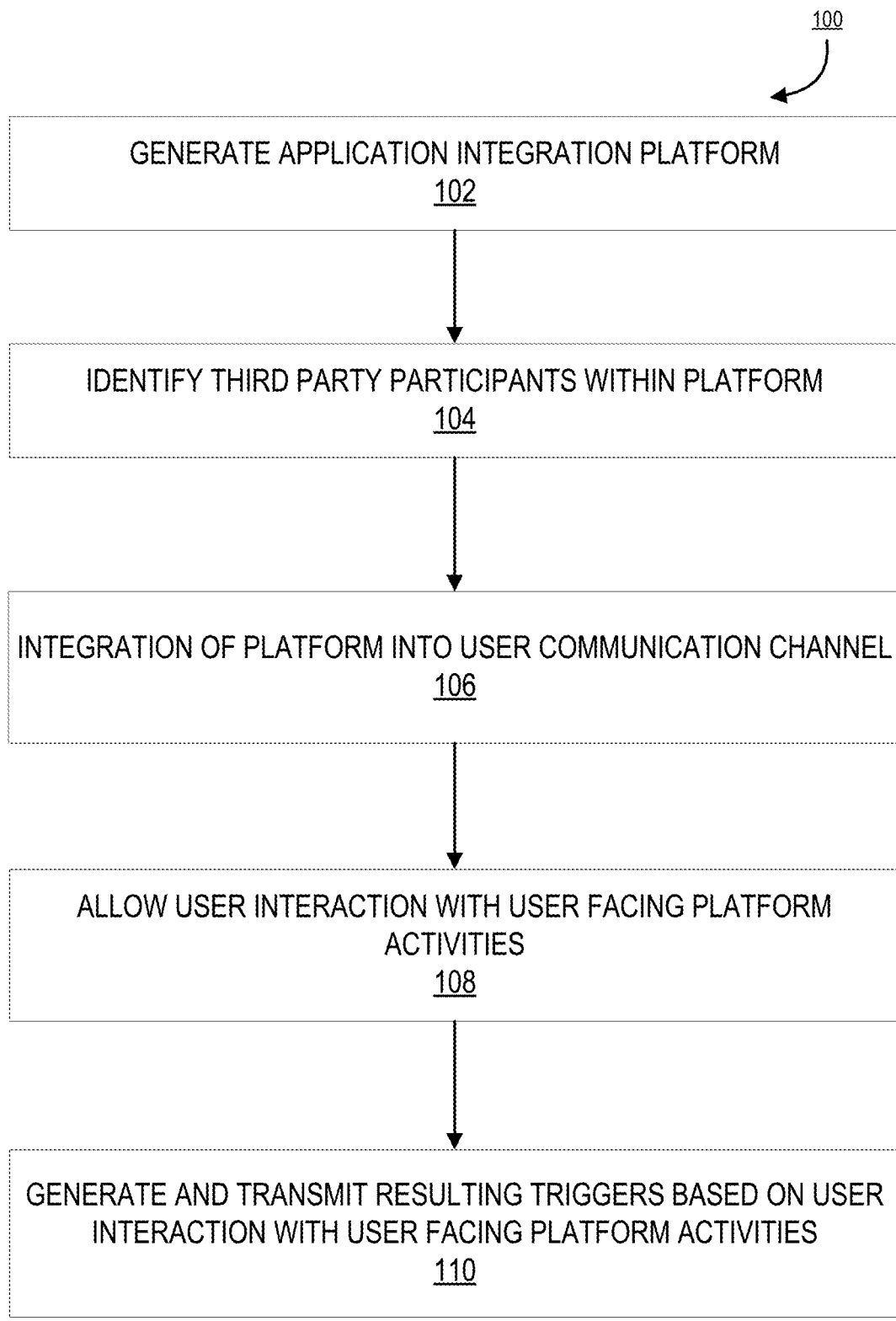
Figure 3:
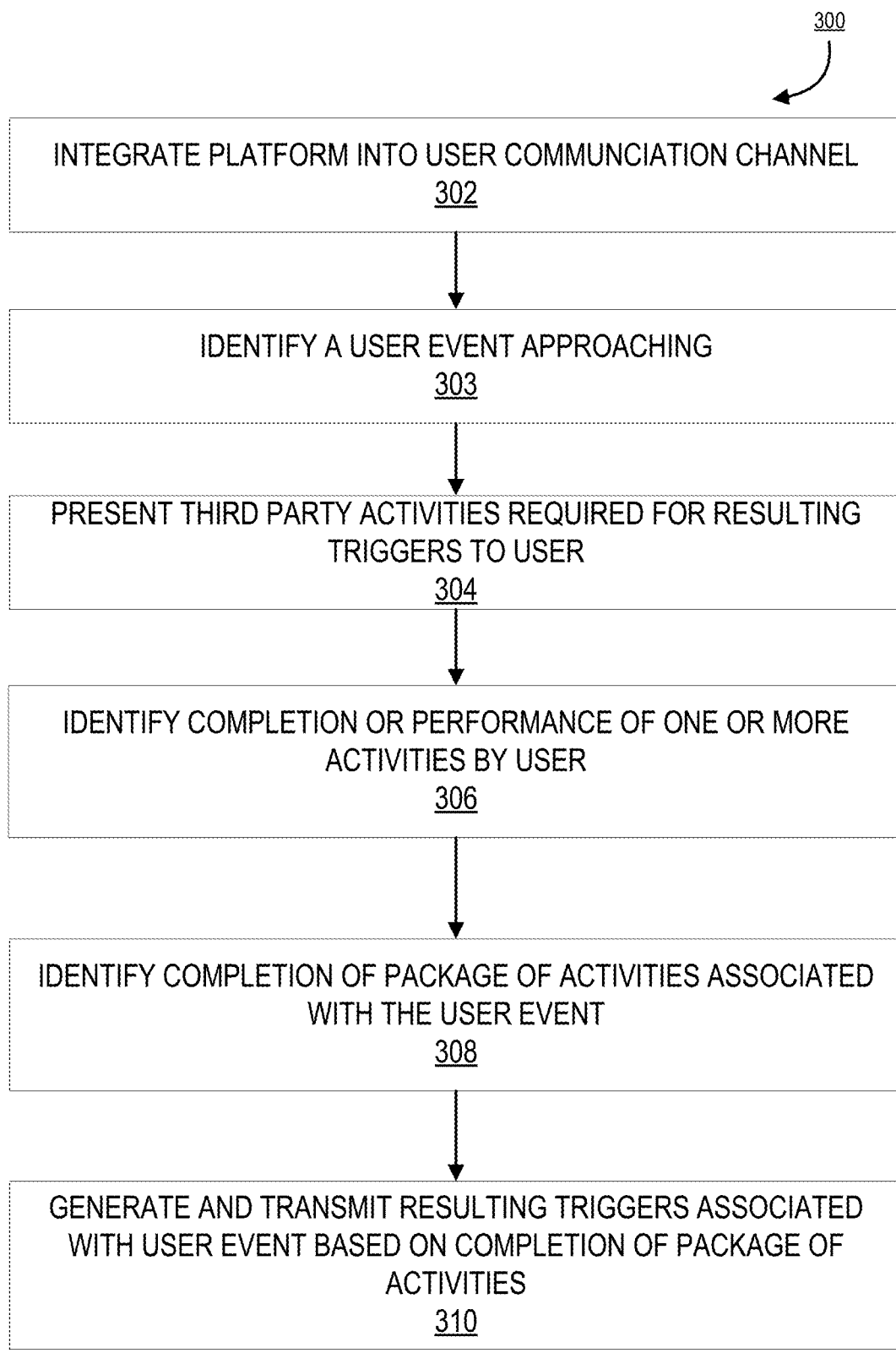
Figure 4:
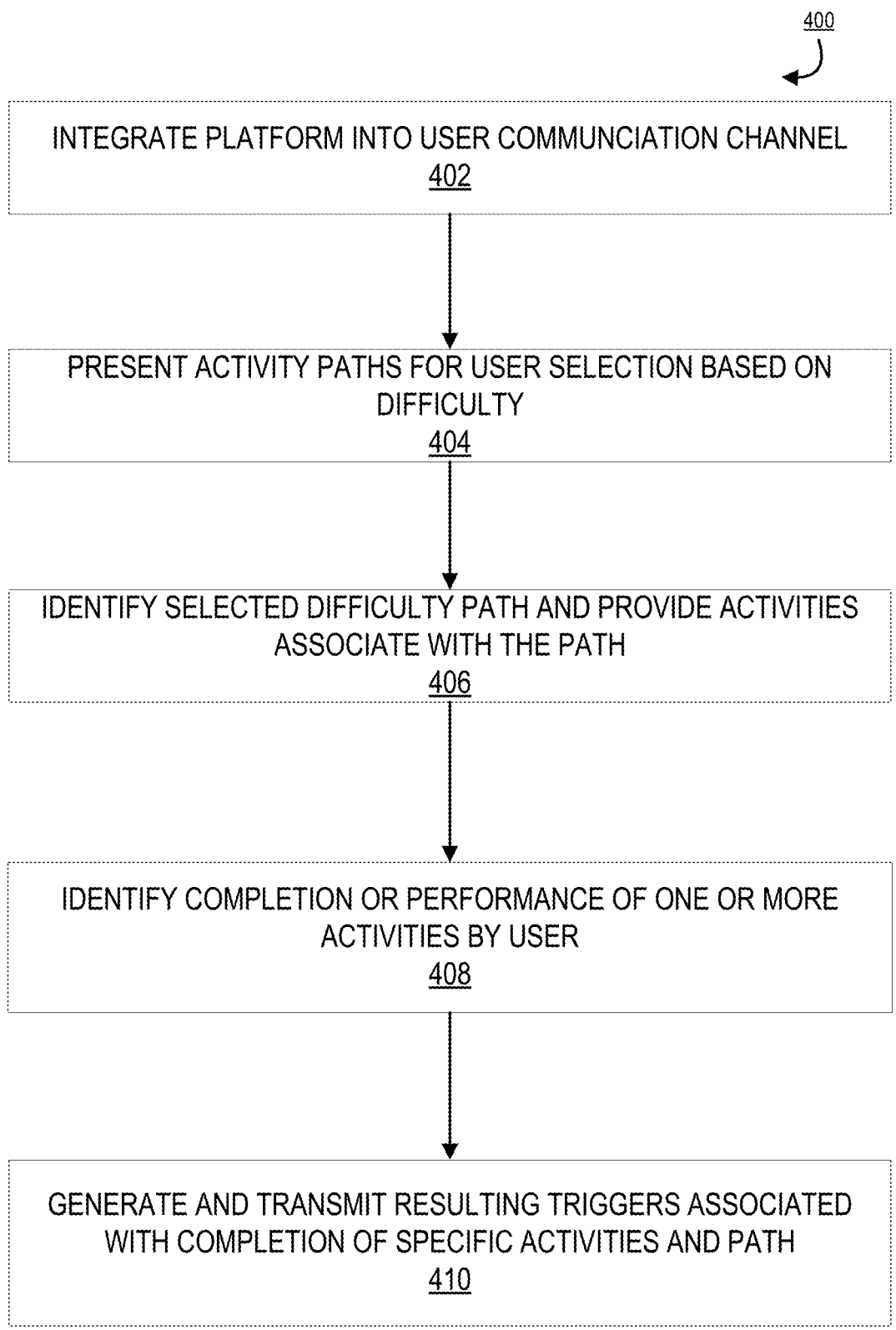
Figure 5:
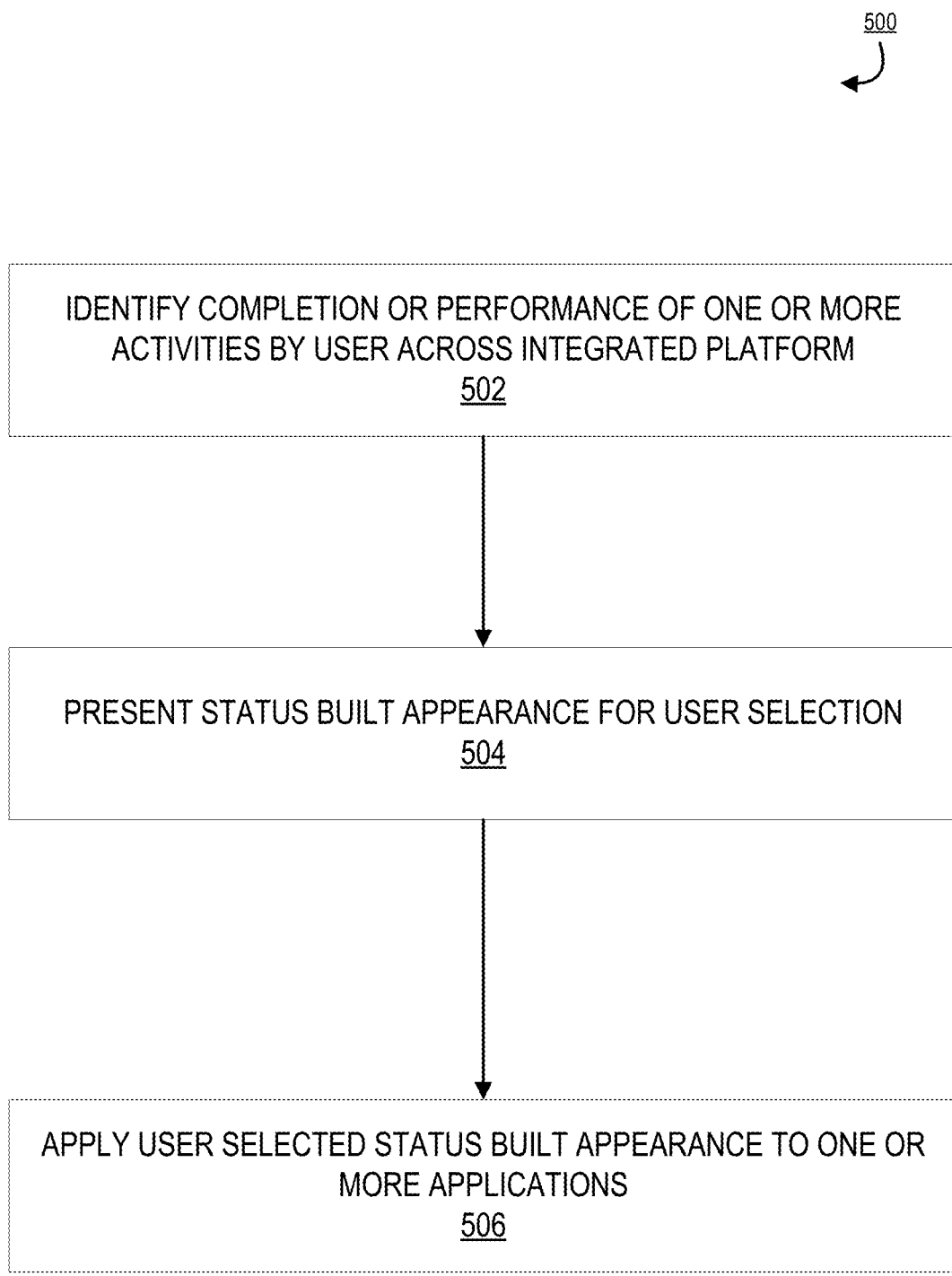

Having thus described embodiments of the invention in general terms, reference will now be made to the accompanying drawings, wherein:

FIG. 1 provides a cross entity application integration system environment, in accordance with one embodiment of the present invention;

FIG. 2 provides a high level process flow illustrating integration and deployment of the third party activity performance cross entity application, in accordance with one embodiment of the present invention;

FIG. 3 provides a flow chart illustrating third party activity completion requirements for resulting triggers, in accordance with one embodiment of the present invention;

FIG. 4 provides a process map illustrating activity pathway selection and deployment, in accordance with one embodiment of the present invention; and FIG. 5 provides a process map illustrating user status build based on achievement from activity completion, in accordance with one embodiment of the present invention.

DETAILED DESCRIPTION OF EMBODIMENTS OF THE INVENTION

Embodiments of the present invention now may be described more fully hereinafter with reference to the accompanying drawings, in which some, but not all, embodiments of the invention are shown. Indeed, the invention may be embodied in many different forms and should not be construed as limited to the embodiments set forth herein; rather, these embodiments are provided so that this disclosure may satisfy applicable legal requirements. Like numbers refer to like elements throughout.

In some embodiments, the invention utilizes a gamification platform for cross-selling or third party relationships with the entity. In this way, the system may generate activities for the user to perform in order to achieve milestones that are cross entity or from third parties. For example, the system may require the user to perform activities associated with a third party provided service or product, such as third parties associated with the travel industry or the like. As such, the system may require the user to purchase one or more products such as airline reservations, car rentals, or the like with a single resource distribution channel. The system may then provide an associated reward offer for the resource distribution, such as free in-flight or airport Wi-Fi. In this way, the system is matching the reward with the user specific behavior across multiple entities. Furthermore, the rewards for resource distribution channeling through selected third parties may correlate with user associates such as family, friends, coworkers, or the like.

In some embodiments, the system may generate gaming paths for the various users. In this embodiment, the system may provide simple games or complex games to the user based on user selection. Each game may be linked to either a coin for rewards to a cross cell promotion within the entity or from third parties. The games are generated on a directed application platform that levels the rewards or promotions based on the complexity of the gaming platform provided. In this way, the system provides a game with a meaningful reward to the user for play within the game.

In some embodiments, the system may further generate personalized application appearances for the user based on activities and/or game play from the user. As such, the system may personalize the user on-line application and/or user resource distribution vehicles, such as credit cards, debit cards, or the like, by providing special colored cards, presenting a symbol on the card or application, generating alternative backgrounds, or the like based on the status the user has achieved within the activity or game play. In this way, by performing activities and/or playing games on the cross entity application integration platform, the system may generate a new background or new symbol that may be presented directly on a user's application or resource distribution vehicles based on a level or status achieved by the user within the activities and/or games.

As used herein, an "account" is the relationship that a user has with an entity and resources stored therein. The account is associated with and/or maintained by the entity. In some embodiments, as used herein the term "activity" may refer to any game, product purchase, service purchase, movement to a location.

As used herein, a "user" may be an entity customer or an individual that integrated or otherwise utilized the applications disclosed herein. A "user interface" is any device or software that allows a user to input information, such as commands or data, into a device, or that allows the device to output information to the user. For example, the user interface include a graphical user interface (GUI) or an interface to input computer-executable instructions that direct a processing device to carry out specific functions. The user interface typically employs certain input and output devices to input data received from a user second user or output data to a user. These input and output devices may include a display, mouse, keyboard, button, touchpad, touch screen, microphone, speaker, LED, light, joystick, switch, buzzer, bell, and/or other user input/output device for communicating with one or more users.

In accordance with embodiments of the invention, the term "module" with respect to a system may refer to a hardware component of the system, a software component of the system, or a component of the system that includes both hardware and software. As used herein, a module may include one or more modules, where each module may reside in separate pieces of hardware or software. In some embodiments, the term "platform" including activity performance cross entity platform, and activity platform may refer to a platform that is used as a base upon which other applications, processing, or technologies are distributed including applications, activities, integration into currently used applications, integration into systems, presentation of user interfaces, and the like.

Further, the embodiments described herein may refer to use of a transaction or transaction event. Unless specifically limited by the context, a "transaction" refers to any communication between the user and an entity. In some embodiments, for example, a transaction may refer to a purchase of goods or services, a return of goods or services, a payment transaction, a credit transaction, or other interaction involving a user's bank account. As further examples, a transaction may occur when an entity associated with the user is alerted. A transaction may occur when a user accesses a building, uses a rewards card, and/or performs an account balance query. A transaction may occur as a user's device establishes a wireless connection, such as a Wi-Fi connection, with a point-of-sale terminal. In some embodiments, a transaction may include one or more of the following: purchasing, renting, selling, and/or leasing goods and/or services; withdrawing cash; making payments to creditors; sending remittances; transferring balances from one account to another account; loading money onto stored value cards (SVCs) and/or prepaid cards; donating to charities; and/or the like.

In some embodiments, the transaction may refer to an event and/or action or group of actions facilitated or performed by a user's device, such as a user's mobile system. Such a device may be referred to herein as a "point-of-sale system" (POS system). A "point-of-sale" (POS) could refer to any location, virtual location or otherwise proximate occurrence of a transaction. A "point-of-sale system" may refer to any device used to perform a transaction, either from the user's perspective, the merchant's perspective or both. In some embodiments, the POS system refers only to a user's system, in other embodiments it refers only to a merchant system, and in yet other embodiments, it refers to both a user device and a merchant device interacting to perform a transaction. For example, in one embodiment, the point-ofsale system refers to the user's mobile device configured to communicate with a merchant's point of sale terminal, whereas in other embodiments, the POS system refers to the merchant's point of sale terminal configured to communicate with a user's mobile device, and in yet other embodiments, the POS system refers to both the user's mobile device and the merchant's point of sale terminal configured to communicate with each other to carry out a transaction.

In some embodiments, a POS system is or includes an interactive computer terminal that is configured to initiate, perform, complete, and/or facilitate one or more transactions. A POS system could be or include any device that a user may use to perform a transaction with an entity, such as, but not limited to, an ATM, a loyalty device such as a rewards card, loyalty card or other loyalty device, a magnetic-based payment device, a personal identification number (PIN) payment device, a contactless payment device, a radio frequency identification device (RFID) and the like, a computer, a mobile device, a merchant terminal, a self-service machine, a public and/or business kiosk, a gaming device, and/or various combinations of the foregoing.

In some embodiments, a POS system is operated in a public place. In other embodiments, the POS system, is additionally or alternatively operated in a place of business. In accordance with some embodiments, the POS system is not owned by the user of the POS system. Rather, in some embodiments, the POS system is owned by a mobile business operator or a POS operator. In yet other embodiments, the POS system is owned by the financial institution offering the POS system providing functionality in accordance with embodiments of the invention described herein.

In some embodiments, the system may integrate an activity performance cross entity platform that provides applications or integration into applications of an activities network. The platform allows for integration of activities and a user interface for the activities into known applications on a user device. Furthermore, in some embodiments, the system may monitor the user use of the activities integrated onto the known applications and provide rewards based on the activities completed. As such, the system may intervene within a known application or third party to provide rewards. In some embodiments, the system may overlay a change or personalization within a third party application, such as providing special colored backgrounds to the application, presenting a symbol on the application, generating alternative backgrounds, or the like based on the status the user has achieved within the activity or game play. Furthermore, the system may communicate with the third party and directly change the physical appearance of a resource distribution card, checkbook, or the like. As such, the system may intercept signals within an entity to change the look, color, or add a symbol to the user's printed credit card, checkbook, or the like. This electronically manipulating an entity system to physically change the appearance of a physical resource distribution card or document.

FIG. 1 provides a cross entity application integration system environment 200, in accordance with one embodiment of the present invention. As illustrated in FIG. 1, the application integration server 208 is operatively coupled, via a network 201 to the user device 204, to the POS system 206, to entity systems 210, and to the commercial partner system 211. In this way, the application integration server 208 can send information to and receive information from the user device 204, the POS system 206, the entity systems 210, and the commercial partner system 211. FIG. 1 illustrates only one example of a cross entity application integration system environment 200, and it will be appreciated that in other embodiments one or more of the systems, devices, or servers may be combined into a single system, device, or server, or be made up of multiple systems, devices, or servers.

The network 201 may be a global area network (GAN), such as the Internet, a wide area network (WAN), a local area network (LAN), or any other type of network or combination of networks. The network 201 may provide for wireline, wireless, or a combination wireline and wireless communication between devices on the network.

In some embodiments, the user 202 is an individual that may download or otherwise utilize the application integration platform to perform one or more activities provided by the platform.

As illustrated in FIG. 1, the application integration server 208 generally comprises a communication device 246, a processing device 248, and a memory device 250. As used herein, the term "processing device" generally includes circuitry used for implementing the communication and/or logic functions of the particular system. For example, a processing device may include a digital signal processor device, a microprocessor device, and various analog-to-digital converters, digital-to-analog converters, and other support circuits and/or combinations of the foregoing. Control and signal processing functions of the system are allocated between these processing devices according to their respective capabilities. The processing device may include functionality to operate one or more software programs based on computer-readable instructions thereof, which may be stored in a memory device.

The processing device 248 is operatively coupled to the communication device 246 and the memory device 250. The processing device 248 uses the communication device 246 to communicate with the network 201 and other devices on the network 201, such as, but not limited to the POS system 206, the user device 204, the third party systems 211, and the entity systems 210. As such, the communication device 246 generally comprises a modem, server, or other device for communicating with other devices on the network 201.

As further illustrated in FIG. 1, the application integration server 208 comprises computer-readable instructions 254 stored in the memory device 250, which in one embodiment includes the computer-readable instructions 254 of an application 258. In some embodiments, the memory device 250 includes data storage 252 for storing data created and/or used by the application 258. The data storage 252 may also store all offers received from third party systems 211.

In the embodiment illustrated in FIG. 1 and described throughout much of this specification, the application 258 may perform the functions disclosed herein. In some embodiments, the application 258 may generate an activity platform, such as a gamification platform for cross-selling or third party relationships with the system. In this way, the application 258 may generate activities for the user 200 to perform in order to achieve milestones that are cross entity or from third parties systems 211. For example, the application 258 may require the user 202 to perform activities associated with a third party system 211 provided service or product, such as third parties associated with the travel industry or the like. As such, the application 258 may require the user 202 to purchase one or more products such as airline reservations, car rentals, or the like with a single resource distribution channel. The application 258 may then provide an associated reward offer for the resource distribution, such as free in-flight or airport Wi-Fi. In this way, the application 258 is matching the reward with the user 202 specific behavior across multiple entities. Furthermore, the rewards for resource distribution channeling through selected third party systems 211 may correlate with user 202 associates such as family, friends, coworkers, or the like.

In some embodiments, the application 258 may generate the activity platform with gaming paths for the user 202. In this embodiment, the application 258 may provide simple games or complex games to the user 202 based on user selection from his/her user device 204. Each game may be linked to either a coin for rewards to a cross cell promotion within the system or from third party systems 211. The games are generated on a directed application platform that levels the rewards or promotions based on the complexity of the gaming platform provided. In this way, the application 258 provides a game with a meaningful reward to the user 202 for play within the game.

In some embodiments, the application 258 may further generate personalized application appearances for the user 202 within the user device 204 presentation or physical presentation of the resource distribution applications of the user 202. This is based on activities and/or game play from the user 202. As such, the application 258 may personalize the user on-line application and/or user resource distribution vehicles, such as credit cards, debit cards, or the like, by providing special colored cards, presenting a symbol on the card or application, generating alternative backgrounds, or the like based on the status the user 202 has achieved within the activity or game play provided by the application 258. In this way, by performing activities and/or playing games on the cross entity application integration platform, the application 258 may generate a new background or new symbol that may be presented directly on a user's application or resource distribution vehicles based on a level or status achieved by the user within the activities and/or games.

In some embodiments, the application 258 may determine the location of the user 202 through location data. Location data may be established by data sent from the POS system 206, GPS data associated with the user 202 or the user's 202 user device 204, transaction history data, accelerometer data, or the like to the application 258. The data from the POS system 206 may include information about where the POS system 206 is located. Therefore, providing the application 258 with data regarding the geographic area the user 202 is either currently within or was within a short time ago. For example, a POS system 206 may be used by a user 202 at a merchant to complete a transaction. Along with the authentication data needed to authenticate the payment for the purchase of a product, the POS system 206 may also send information as to the location of the merchant to the financial institution. Therefore, the application 258 may receive address information or at least general geographic indication information for the merchant where the user 202 just completed a transaction. Location data may also be received by the application 258 from a user device 204 of a user 202, the merchant, accelerometer data, GPS data, or the like. In this way, the location of the user 202 may be known, even if the user 202 is not making a purchase. Therefore an offer may be provided to the user 202 at anytime, independent of the user 202 making a transaction.

The user's 202 transaction data may be determined by the application 258. The user's 202 transaction data may comprise recent transactions or transaction history data. A financial institution may be uniquely situated to receive transaction data from a POS system 206 if the user 202 is utilizing a financial institution payment mechanism for a transaction. The financial institution may receive authentication data from the POS system 206 to authenticate the transaction of the user 202. This authentication data may be used by the application 258 such that the application 258 may further determine the location of the user 202 in real-time or close thereto, the amount the user 202 is spending, and/or the general product classification the user 202 is purchasing. In some embodiments, transaction history data may be received from the financial institution directly, other financial institutions, the user 202 directly, or the like and do not necessarily have to be established by information received from a POS device 206. This transaction data may be stored within the financial institution, such that recent transactions as well as transaction history may be acquired by the application 258. In this way, the application 258 may determine the locations the user 202 likes to frequent, the merchants the user 202 typically purchases from, the history of transactions of the user 202, and the like to aid in determining appropriate offers to provide the user 202.

Furthermore the application 258 may further comprise an artificial intelligence (AI) or other type of intelligence program provided. In this way, the application 258 may analyze the user's 202 location data, transaction data, and activity data to make an intelligent, yet predicted trigger response recommendation for the user 202.

As illustrated in FIG. 1, the POS system 206 generally comprises a reading device 235, a communication device 236, a processing device 238, and a memory device 240. The reading device 235 is operatively coupled to the processing device 238, communication device 236, and the memory device 240. The POS system 206 may include a reader device 235 to receive payment account information from the user 202 through the user device 204 and/or other payment devices. Such a reader device 235 may include a magnetic strip reader, a barcode scanner, a radio frequency (RF) reader, a character recognition device, a magnetic ink reader, a processor for interpreting codes presented over an electrical or optical medium, a biometric reader, a wireless receiving device, and/or the like. In some embodiments, the reading device 235 receives information that may be used to identify the user's 202 payment account and/or transaction data at the POS system 206 and communicates the information via the communication device 236 over a network 201, to other systems such as, but not limited to the application integration server 208, entity systems 210, and/or the third party system 211. As such, the communication device 236 generally comprises a modem, server, or other device for communicating with other devices on the network 201.

As further illustrated in FIG. 2, the POS system 206 comprises computer-readable instructions 242 stored in the memory device 240, which in one embodiment includes the computer-readable instructions 242 of a merchant application 244. A POS system 206 may refer to any device used to perform a transaction, either from the user's perspective, the merchant's perspective or both. In some embodiments, the POS system 206 may refer only to a user's device, in other embodiments it refers only to a merchant device, and in yet other embodiments, it refers to both a user device and a merchant device interacting to perform a transaction. For example, in one embodiment, the POS system 206 refers to the user's mobile device configured to communicate with a merchant's point of sale terminal, whereas in other embodiments, the POS system 206 refers to the merchant's point of sale terminal configured to communicate with a user's mobile device, and in yet other embodiments, the POS system 206 refers to both the user's mobile device and the merchant's point of sale terminal configured to communicate with each other to carry out a transaction.

In some embodiments, a POS system 206 is or includes an interactive computer terminal that is configured to initiate, perform, complete, and/or facilitate one or more transactions. The POS system 206 as discussed herein may include any point of transaction device, such at a cash register, POS terminal, ATM, smart phone, back end server of a merchant, or the like. As such, the POS system 206 may be able perform a sale, an account balance check, a reward transfer, and account money transfer, a user 202 opening up a bank application on his mobile device or computer, a user 202 using his/her e-wallet, and/or the like.

In the embodiment illustrated in FIG. 1, the merchant application 244 allows the POS system 206 to be linked to the application integration server 208 to communicate, via a network 201, the information related to the transaction being made, such as the transaction type, cost of transaction, product type, merchant location, user 202 location, and the like. The merchant application 244 may also receive information from the application integration server 208. The merchant application 244, in some embodiments, may receive indication of a resulting trigger to present to a user 202 or the like.

FIG. 1 also illustrates a user device 204. The user device 204 generally comprises a communication device 212, a processing device 214, and a memory device 216. The processing device 214 is operatively coupled to the communication device 212 and the memory device 216. The processing device 214 uses the communication device 212 to communicate with the network 201 and other devices on the network 201, such as, but not limited to the POS system 206, the application integration server 208, the third party systems 211, and the entity systems 210. As such, the communication device 212 generally comprises a modem, server, or other device for communicating with other devices on the network 201.

As further illustrated in FIG. 1, the user device 204 comprises computer-readable instructions 220 stored in the memory device 216, which in one embodiment includes the computer-readable instructions 220 of a user application 222. In this way, a user 202 may be able to opt-in to the program, interact with the application, and/or the like using the user application 222. A "mobile device" 204 may be any mobile communication device, such as a cellular telecommunications device (i.e., a cell phone or mobile phone), personal digital assistant (PDA), a mobile Internet accessing device, or other mobile device including, but not limited to portable digital assistants (PDAs), pagers, mobile televisions, gaming devices, laptop computers, cameras, video recorders, audio/video player, radio, GPS devices, any combination of the aforementioned, or the like. Although only a single user device 204 is depicted in FIG. 1, the payment account determination system environment 200 may contain numerous mobile devices 204.

The entity systems 210 are operatively coupled to the application integration server 208, the POS system 206, the user device 204, and/or the third party systems 211 through the network 201. The entity systems 210 have systems with devices the same or similar to the devices described for the application integration server 208, the POS system 206, and/or the user device 204 (i.e., communication device, processing device, and memory device). Therefore, the entity systems 210 communicate with the application integration server 208, the POS system 206, the third party systems 211, and/or the user device 204 in the same or similar way as previously described with respect to each system.

The third party systems 211 is operatively coupled to the application integration server 208, the POS system 206, the user device 204, and/or the entity systems 210 through the network 201. The third party system 211 has systems with devices the same or similar to the devices described for the application integration server 208, the POS system 206, and/or the user device 204 (i.e., communication device, processing device, and memory device). Therefore, the third party system 211 communicates with the application integration server 208, the POS system 206, the entity systems 210, and/or the user device 204 in the same or similar way as previously described with respect to each system.

It is understood that the servers, systems, and devices described herein illustrate one embodiment of the invention. It is further understood that one or more of the servers, systems, and devices can be combined in other embodiments and still function in the same or similar way as the embodiments described herein.

FIG. 2 illustrates a high level process flow for integration and deployment of the third party activity performance cross entity application 100, in accordance with one embodiment of the present invention. As illustrated in block 102, the process 100 is initiated by generation the application integration platform. The platform allows for the third party activities to be performed and for across entity application of the activities. In this way, the platform may provide a user with applications or with code embedded within applications in order to utilize the platform for activities such as games, actions, or the like.

Next, as illustrated in block 104, the process 100 continues by identifying third party participants within the platform. In this way, the system may identify third party entities such as product or service providers that may have an interest in being associated with the platform. As such, entities that provide services may provide offers, promotions, or the like to the platform for integration of the third party products or services into the platform.

Once the third party entities are identified, the process 100 continues by integrating the platform into the user communication channels as illustrated in block 106. In some embodiments, this integration may be in the form of an application provided on the user mobile device. In other embodiments, this integration may be an integration in to a pre-existing application on the user's mobile device, such as on an online banking application, third party application, or the like. In yet other embodiments, this integration may be a physical integration into the user's resource card, resource accounts, checks, or the like.

As illustrated in block 108, the process 100 continues by allowing the user to interact with the user facing platform activities. As such, in some embodiments, the integration of the platform into the user communication channels may include the integration of one or more activities for the user to complete. These activities may be in the form of games, tasks, purchases, download requirements, linking or liking social network statuses, or the like. As such, the platform may present a user facing interface, the interface may be presented on the application provided by the platform, integrated and stored within a third party application, or the like.

As illustrated in block 110, the process 100 ends by generating and transmitting resulting triggers based on the user interaction with user facing platform activities. In this way, the system may monitor the user use and completion of the activities and reward the user with programmed result triggers that may include products, services, benefits, promotions, status changes, or the like.

FIG. 3 illustrates a flow chart for third party activity completion requirements for resulting triggers 300, in accordance with one embodiment of the present invention. In some embodiments, the invention utilizes a gamification platform for cross-selling or third party relationships with the entity. In this way, the system may generate activities for the user to perform in order to achieve milestones that are cross entity or from third parties. For example, the system may require the user to perform activities associated with a third party provided service or product, such as third parties associated with the travel industry or the like. As such, the system may require the user to purchase one or more products such as airline reservations, car rentals, or the like with a single resource distribution channel. The system may then provide an associated reward offer for the resource distribution, such as free in-flight or airport Wi-Fi. In this way, the system is matching the reward with the user specific behavior across multiple entities. Furthermore, the rewards for resource distribution channeling through selected third parties may correlate with user associates such as family, friends, coworkers, or the like.

As illustrated in block 302, the process 300 is initiated by integrating the platform into the user communication channel. The platform allows the system to build and integrate applications into a user device for presentation of activities. In other embodiments, the platform allows for activity integration into currently utilized applications of the user. In this way, the platform may provide a user with applications or with code embedded within applications in order to utilize the platform for activities such as games, actions, or the like.

Next, as illustrated in block 303, the process 300 identifies a user event approaching. A user event may include life events of the user, such as traveling, moving, purchasing a house, purchasing a car, getting married, retiring, or the like. As such, the system may be communicably linked to a financial institution that may provide transaction history records to the system that may indicate one or more of the user events occurring in the future. As such, the system may identify the user purchasing airline tickets for a trip. In other embodiments, the user may notify the system of the occurrence of the event.

After the system has identified the user event approaching, the system may identify third party entities associated with the user event. For example, if the user is flying to a destination, the system may identify third party entities associated with airports, airlines, car rental, hotels, restaurants, and the like. As such, the system identifies and gathers third party entities associated with the user event and communicates with those third parties. The system may identify activities associated with the third parties that the user may need to complete to obtain a resulting trigger. These activities may include going to a third party merchant, purchasing from a third party merchant, or the like. In some embodiments, the system provides rewards based on cross entity activities completed by the user.

As illustrated in block 304, the process 300 continues by presenting third party activities required for a resulting triggers to the user. In this way, the system may present one or more activities that a user may be required to perform in order to be presented with a resulting trigger, such as a reward. These activities may include purchasing a product from a third party, enrolling in a third party program, viewing a third party entity website, or the like.

The activities are integrated into the user device, such as from a platform generated application or integration within a current application the user may have on his/her user device. The platform, through the integration may monitor the user activity to determine if one or more activities have been completed by the user. As such, as illustrated in block 306, the process 300 continues by identifying the completion of or performance of one or more activities by the user.

In some embodiments, the system may require the user to perform multiple activities to trigger a response reward. As such, the system may continue to store and monitor the user's progress through the activities. In this way, the system may further identify the completion of a package of activities associated with the user event, as illustrated in block 308. In this way, for example if the user is traveling, the activities required may include purchasing an airline ticket using Credit Card A, visiting a third party rental car website, and make a hotel reservation.

Upon completion of the package of activities associated with the user event, the system may generate and transmit a resulting trigger response associated with the user event based on the completion of the package of activities, as illustrated in block 310. As such, upon identification of completion of the package of activities associated with the user event, the user may be rewarded with a resulting trigger. The resulting trigger may be a product, server, or the like associated with or to be used during the event. In may include free access to the internet during travel or the like. In this way, the system may integrate the utilization of third party merchants together to produce a meaningful resulting trigger for the user from another third party, as such cross linking entities for user reward achievement.

FIG. 4 illustrates process map for activity pathway selection and deployment 400, in accordance with one embodiment of the present invention. In this way, the system may generate gaming paths for the various users. In this embodiment, the system may provide simple games or complex games to the user based on user selection. Each game may be linked to either a coin for rewards to a cross cell promotion within the entity or from third parties. The games are generated on a directed application platform that levels the rewards or promotions based on the complexity of the gaming platform provided. In this way, the system provides a game with a meaningful reward to the user for play within the game.

As illustrated in block 402, the process 400 is initiated by integrating the platform into the user communication channel. The platform allows the system to build and integrate applications into a user device for presentation of activities. In other embodiments, the platform allows for activity integration into currently utilized applications of the user. In this way, the platform may provide a user with applications or with code embedded within applications in order to utilize the platform for activities such as games, actions, or the like.

Next, as illustrated in block 404, the process 400 continues by presenting one or more activity paths for the user selection, where the activity paths for selection are based on difficulty. As such, in this embodiment, the system generates games that may be played via the user device. These games may include swipe games, board games, sports, mind games, or the like. The paths may include varying levels of difficult to the games such that the user may select the difficulty he/she desires. The more difficult the game, the more valuable the resulting trigger.

As illustrated in block 406, the process 400 continues by identifying the selected difficulty path by the user and providing the activities associated with that path to the user. The system may provide the activities via an application generated by the platform. In other embodiments, the system may provide the activities via integration into a third party's application for user experience on a user device.

Next, as illustrated in block 408, the process 400 continues by identifying the completion or performance of the one or more activities by the user. As such, the system identifies the completion of levels within a game, the time spent playing a game, or the like.

As illustrated in block 410, the process 400 is completed by generating and transmitting the resulting triggers associated with the completion of activities or levels within the path selected. The resulting triggers, in some embodiments, may be a reward, coupon, discount, or the like for a third party, from a financial institution, coins, or the like. In this way, the system may generate gaming paths for the various users. In this embodiment, the system may provide simple games or complex games to the user based on user selection. Each game may be linked to either a coin for rewards to a cross cell promotion within the entity or from third parties. In this way, the system provides a game with a meaningful reward to the user for play within the game.

FIG. 5 illustrates a process map for user status build based on achievement from activity completion 500, in accordance with one embodiment of the present invention. In some embodiments, the system may further generate personalized application appearances for the user based on activities and/or game play from the user. As such, the system may personalize the user on-line application and/or user resource distribution vehicles, such as credit cards, debit cards, or the like, by providing special colored cards, presenting a symbol on the card or application, generating alternative backgrounds, or the like based on the status the user has achieved within the activity or game play. In this way, by performing activities and/or playing games on the cross entity application integration platform, the system may generate a new background or new symbol that may be presented directly on a user's application or resource distribution vehicles based on a level or status achieved by the user within the activities and/or games.

As illustrated in block 502, the process 500 is initiated by identifying the completion or performance of one or more activities by the user across the platform. In this way, the system may identify activities performed for third party cross integration disclosed above in FIG. 3 and/or activities in the form of leveled difficulty games disclosed above in FIG. 4. The system, via the platform may include an application that provides the activities to the user for completion. As such, the system may obtain communication from the application regarding the use of the activities by the user. In other embodiments, the platform may integrate the activities into third party applications and as such, may extract data on activity usage from the third party applications.

The system may determine a status obtained by the user based on user usage and interaction with the activities. In this way, the longer the user interacts with the activities the higher the user status. Furthermore, the more levels achieved, the higher the user status. The system may have several tiers of statuses that are obtainable to a user based on his/her interaction with the activities.

Next, as illustrated in block 504, the process 500 continues by presenting a status built appearance for the user selection. The status built appearance is the appearance that the user has achieved based on his/her interaction with the activities. These appearances may include overlay of a special background on an application, overlay of a symbol on the application, unique thumbnail for an application, personal assistant for an application, or the like. In some embodiments, the application may be associated with the system. In other embodiments, the application may be a third party managed application that the platform has manipulated to provide the change in appearance.

In some embodiments, the status built appearance may be an appearance of a physical resource distribution item, such as a credit card, debit card, check, or the like. In this way, the application may communicate with the third party that creates the resource distribution item and manipulate the generation of the user's item to have a unique color, symbol, logo, or the like associated and affixed to the resource distribution item.

In this way, the system may monitor the user use of the activities integrated onto the known applications and provide rewards based on the activities completed. As such, the system may intervene within a known application or third party to provide rewards. In some embodiments, the system may overlay a change or personalization within a third party application, such as providing special colored backgrounds to the application, presenting a symbol on the application, generating alternative backgrounds, or the like based on the status the user has achieved within the activity or game play. Furthermore, the system may communicate with the third party and directly change the physical appearance of a resource distribution item such as a card, checkbook, or the like. As such, the system may intercept signals within an entity to change the look, color, or add a symbol to the user's printed credit card, checkbook, or the like. This electronically manipulating an entity system to physically change the appearance of a physical resource distribution card or document.

Next, as illustrated in block 506, the process 500 is completed by applying the user selected status built appearance to one or more applications or resource distribution items.

As will be appreciated by one of ordinary skill in the art, the present invention may be embodied as an apparatus (including, for example, a system, a machine, a device, a computer program product, and/or the like), as a method (including, for example, a business process, a computer-implemented process, and/or the like), or as any combination of the foregoing. Accordingly, embodiments of the present invention may take the form of an entirely software embodiment (including firmware, resident software, microcode, or the like), an entirely hardware embodiment, or an embodiment combining software and hardware aspects that may generally be referred to herein as a "system." Furthermore, embodiments of the present invention may take the form of a computer program product that includes a computer-readable storage medium having computer-executable program code portions stored therein. As used herein, a processor may be "configured to" perform a certain function in a variety of ways, including, for example, by having one or more general-purpose circuits perform the functions by executing one or more computer-executable program code portions embodied in a computer-readable medium, and/or having one or more application-specific circuits perform the function.

It will be understood that any suitable computer-readable medium may be utilized. The computer-readable medium may include, but is not limited to, a non-transitory computer-readable medium, such as a tangible electronic, magnetic, optical, infrared, electromagnetic, and/or semiconductor system, apparatus, and/or device. For example, in some embodiments, the non-transitory computer-readable medium includes a tangible medium such as a portable computer diskette, a hard disk, a random access memory (RAM), a read-only memory (ROM), an erasable programmable read-only memory (EPROM or Flash memory), a compact disc read-only memory (CD-ROM), and/or some other tangible optical and/or magnetic storage device. In other embodiments of the present invention, however, the computer-readable medium may be transitory, such as a propagation signal including computer-executable program code portions embodied therein.

It will also be understood that one or more computer-executable program code portions for carrying out operations of the present invention may include object-oriented, scripted, and/or unscripted programming languages, such as, for example, Java, Perl, Smalltalk, C++, SAS, SQL, Python, Objective C, and/or the like. In some embodiments, the one or more computer-executable program code portions for carrying out operations of embodiments of the present invention are written in conventional procedural programming languages, such as the "C" programming languages and/or similar programming languages. The computer program code may alternatively or additionally be written in one or more multi-paradigm programming languages, such as, for example, F #.

It will further be understood that some embodiments of the present invention are described herein with reference to flowchart illustrations and/or block diagrams of systems, methods, and/or computer program products. It will be understood that each block included in the flowchart illustrations and/or block diagrams, and combinations of blocks included in the flowchart illustrations and/or block diagrams, may be implemented by one or more computer-executable program code portions. These one or more computer-executable program code portions may be provided to a processor of a general purpose computer, special purpose computer, and/or some other programmable data processing apparatus in order to produce a particular machine, such that the one or more computer-executable program code portions, which execute via the processor of the computer and/or other programmable data processing apparatus, create mechanisms for implementing the steps and/or functions represented by the flowchart(s) and/or block diagram block(s).

It will also be understood that the one or more computer-executable program code portions may be stored in a transitory or non-transitory computer-readable medium (e.g., a memory, or the like) that can direct a computer and/or other programmable data processing apparatus to function in a particular manner, such that the computer-executable program code portions stored in the computer-readable medium produce an article of manufacture, including instruction mechanisms which implement the steps and/or functions specified in the flowchart(s) and/or block diagram block(s).

The one or more computer-executable program code portions may also be loaded onto a computer and/or other programmable data processing apparatus to cause a series of operational steps to be performed on the computer and/or other programmable apparatus. In some embodiments, this produces a computer-implemented process such that the one or more computer-executable program code portions which execute on the computer and/or other programmable apparatus provide operational steps to implement the steps specified in the flowchart(s) and/or the functions specified in the block diagram block(s). Alternatively, computer-implemented steps may be combined with operator and/or human-implemented steps in order to carry out an embodiment of the present invention.

While certain exemplary embodiments have been described and shown in the accompanying drawings, it is to be understood that such embodiments are merely illustrative of, and not restrictive on, the broad invention, and that this invention not be limited to the specific constructions and arrangements shown and described, since various other changes, combinations, omissions, modifications and substitutions, in addition to those set forth in the above paragraphs, are possible. Those skilled in the art will appreciate that various adaptations and modifications of the just described embodiments can be configured without departing from the scope and spirit of the invention. Therefore, it is to be understood that, within the scope of the appended claims, the invention may be practiced other than as specifically described herein.

INCORPORATION BY REFERENCE

To supplement the present disclosure, this application further incorporates entirely by reference the following commonly assigned patent applications:

| Docket Number | U.S. patent application Ser. No. | Title | Filed On |
| --- | --- | --- | --- |
| 7628US1.014033.2952 | 15/430,017 | TARGETED RESOURCE TOKEN GENERATION AND DEPLOYMENT | Concurrently herewith |
| 7630US1.014033.2954 | 15/430,013 | SYSTEM AND METHOD FOR LOCATION-BASED TRAFFICKING FOR RESOURCE ACCUMULATION | Concurrently herewith |
| 7631US1.014033.2955 | 15/430,000 | CUSTOMIZED INTERACTION MANIPULATION AND IMPLEMENTATION FOR RESOURCE STORAGE | Concurrently herewith |
| 7632US1.014033.2956 | 15/430,028 | RESOURCE ALLOCATION INTERFACE FOR INTERACTIVE RESOURCE DISTRIBUTION | Concurrently herewith |

What is claimed is:

1. A system for cross entity activity performance platform deployment, the system comprising:
    a memory device with computer-readable program code stored thereon;
    a communication device;
    a processing device operatively coupled to the memory device and the communication device, wherein the processing device is configured to execute the computer-readable program code to:
        generate a platform for application generation or application integration, wherein the platform comprises activities for user completion;
        cross entity and third party integrate trigger results for activity completion by the user;

implement, upon user authorization, the platform via a user device for presentation of the activities, wherein implementing the platform further comprises implementation of the platform via integration of the platform on to a pre-existing application on the user device;

allow user selection of activities path, wherein activities path selection modifies valuation of status building achievement;

monitor user interaction with activities using integration of the platform on the pre-existing application;

determine status built based on amount of user interaction with activities;

in response to determining status built, apply physical change to a background of the pre-existing application and present symbol based on the valuation of status built achievement; and in response to determining status built, apply a physical change to a resource distribution card associated with the user, wherein the physical change to the resource distribution card comprises communication with a third party manufacturer of the resource distribution card and manipulation of a background color or addition of a symbol to the resource distribution card.

2. The system of claim 1, wherein the platform integrates into a third party application on the user device and presents activities for the user on the third party application.

3. The system of claim 1, further comprising providing tiered activities to the user, wherein the tiered activities are tiered based on difficultly.

4. The system of claim 1, further comprising identifying life events for a user, wherein the life events are identified by transaction history of the user, wherein the life event includes the user traveling via airline and the transaction history includes a purchase of an airline ticket.

5. The system of claim 1, wherein activities include electronic games the user manipulates via a user device.

6. The system of claim 1, wherein activities include one or more physical activities for user completion, wherein physical activities include purchasing a product from one or more third party merchants and visiting one or more third party merchant locations.

7. The system of claim 1, wherein trigger results further comprise rewards from a third party associated with user activity completion or a user life event.

8. A computer program product for cross entity activity performance platform deployment, the computer program product comprising at least one non-transitory computer-readable medium having computer-readable program code portions embodied therein, the computer-readable program code portions comprising:

an executable portion configured for generating a platform for application generation or application integration, wherein the platform comprises activities for user completion;

an executable portion configured for cross entity and third party integrating trigger results for activity completion by the user;

an executable portion configured for implementing, upon user authorization, the platform via a user device for presentation of the activities, wherein implementing the platform further comprises implementation of the platform via integration of the platform on to a pre-existing application on the user device;

an executable portion configured for allowing user selection of activities path, wherein activities path selection modifies valuation of status building achievement;

an executable portion configured for monitoring user interaction with activities using integration of the platform on the pre-existing application;

an executable portion configured for determining status built based on amount of user interaction with activities; and an executable portion configured for applying, in response to determining status built, physical change to a background of the pre-existing application and present symbol based on the valuation of status built achievement; and an executable portion configured for applying, in response to determining status built, a physical change to a resource distribution card associated with the user, wherein the physical change to the resource distribution card comprises communicating with a third party manufacturer of the resource distribution card and manipulating a background color or addition of a symbol to the resource distribution card.

9. The computer program product of claim 8, wherein the platform integrates into a third party application on the user device and presents activities for the user on the third party application.

10. The computer program product of claim 8, further comprising an executable portion configured for providing tiered activities to the user, wherein the tiered activities are tiered based on difficultly.

11. The computer program product of claim 8, further comprising an executable portion configured for identifying life events for a user, wherein the life events are identified by transaction history of the user, wherein the life event includes the user traveling via airline and the transaction history includes a purchase of an airline ticket.

12. The computer program product of claim 8, wherein activities include electronic games the user manipulates via a user device.

13. The computer program product of claim 8, wherein activities include one or more physical activities for user completion, wherein physical activities include purchasing a product from one or more third party merchants and visiting one or more third party merchant locations.

14. The computer program product of claim 8, wherein trigger results further comprise rewards from a third party associated with user activity completion or a user life event.

15. A computer-implemented method for cross entity activity performance platform deployment, the method comprising:

providing a computing system comprising a computer processing device and a non-transitory computer readable medium, where the computer readable medium comprises configured computer program instruction code, such that when said instruction code is operated by said computer processing device, said computer processing device performs the following operations:

generating a platform for application generation or application integration, wherein the platform comprises activities for user completion;

cross entity and third party integrating trigger results for activity completion by the user;

implementing, upon user authorization, the platform via a user device for presentation of the activities, wherein implementing the platform further comprises implementation of the platform via integration of the platform on to a pre-existing application on the user device;

allowing user selection of activities path, wherein activities path selection modifies valuation of status building achievement;

monitoring user interaction with activities using integration of the platform on the pre-existing application;

determining status built based on amount of user interaction with activities; and applying, in response to determining status built, physical change to a background of the pre-existing application and present symbol based on the valuation of status built achievement; and applying, in response to determining status built, a physical change to a resource distribution card associated with the user, wherein the physical change to the resource distribution card comprises communicating with a third party manufacturer of the resource distribution card and manipulating a background color or addition of a symbol to the resource distribution card.

16. The computer-implemented method of claim 15, further comprising identifying life events for a user, wherein the life events are identified by transaction history of the user, wherein the life event includes the user traveling via airline and the transaction history includes a purchase of an airline ticket.

17. The computer-implemented method of claim 15, wherein activities include one or more physical activities for user completion, wherein physical activities include purchasing a product from one or more third party merchants and visiting one or more third party merchant locations.

* * * * *